(12) United States Patent
Venkataraman (10) Patent No.: US 10,643,383 B2
(45) Date of Patent: May 5, 2020

(54) SYSTEMS AND METHODS FOR 3D FACIAL MODELING

(71) Applicant: FotoNation Limited, Galway (IE)

(72) Inventor: Kartik Venkataraman, San Jose, CA (US)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/823,473

(22) Filed: Nov. 27, 2017

(65) Prior Publication Data
US 2019/0164341 A1 May 30, 2019

(51) Int. Cl.
G06T 17/20 (2006.01)
G06T 7/149 (2017.01)
G06T 7/593 (2017.01)
G06K 9/00 (2006.01)

(52) U.S. Cl.
CPC .......... G06T 17/20 (2013.01); G06K 9/00241 (2013.01); G06T 7/149 (2017.01); G06T 7/593 (2017.01); *G06T 2200/08* (2013.01); *G06T 2207/10012* (2013.01); *G06T 2207/10021* (2013.01); *G06T 2207/10028* (2013.01); *G06T 2207/20084* (2013.01); *G06T 2207/20164* (2013.01); *G06T 2207/20228* (2013.01); *G06T 2207/30201* (2013.01)

(58) Field of Classification Search
None
See application file for complete search history.

(56) References Cited

U.S. PATENT DOCUMENTS

| | | |
|---|---|---|
| 8,619,082 B1 | 12/2013 | Ciurea et al. |
| 8,902,321 B2 | 12/2014 | Venkataraman et al. |
| 9,729,865 B1 * | 8/2017 | Kuo ................... G06K 9/00268 |
| 2005/0111705 A1 | 5/2005 | Waupotitsch et al. |
| 2006/0215924 A1 * | 9/2006 | Steinberg ........... G06K 9/00228 382/254 |
| 2008/0152213 A1 | 6/2008 | Medioni et al. |

(Continued)

OTHER PUBLICATIONS

Widanagamaachchi et al., "3D Face Recognition from 2D Images: A Survey", Proceedings of the International Conference on Digital Image Computing: Techniques and Applications, Dec. 1-3, 2008 (Year: 2008).*

(Continued)

*Primary Examiner* — Xiao M Wu
*Assistant Examiner* — Steven Z Elbinger
(74) *Attorney, Agent, or Firm* — KPPB LLP (57) ABSTRACT

In an embodiment, a 3D facial modeling system includes a plurality of cameras configured to capture images from different viewpoints, a processor, and a memory containing a 3D facial modeling application and parameters defining a face detector, wherein the 3D facial modeling application directs the processor to obtain a plurality of images of a face captured from different viewpoints using the plurality of cameras, locate a face within each of the plurality of images using the face detector, wherein the face detector labels key feature points on the located face within each of the plurality of images, determine disparity between corresponding key feature points of located faces within the plurality of images, and generate a 3D model of the face using the depth of the key feature points.

19 Claims, 8 Drawing Sheets

(56) References Cited

U.S. PATENT DOCUMENTS

| | | | |
|---|---|---|---|
| 2011/0084893 A1* | 4/2011 | Lee | G06F 1/1649 345/6 |
| 2011/0102553 A1 | 5/2011 | Corcoran et al. | |
| 2014/0307063 A1* | 10/2014 | Lee | G06K 9/4614 348/51 |
| 2015/0228081 A1* | 8/2015 | Kim | G06T 7/593 348/47 |
| 2016/0042548 A1* | 2/2016 | Du | G06T 13/40 345/473 |
| 2016/0309134 A1 | 10/2016 | Venkataraman et al. | |
| 2017/0142405 A1* | 5/2017 | Shors | G01C 11/04 |
| 2018/0286120 A1* | 10/2018 | Fleishman | G06T 17/20 |
| 2019/0012768 A1* | 1/2019 | Tafazoli Bilandi | G06T 7/50 |

OTHER PUBLICATIONS

Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.

Berretti et al., "Face Recognition by Super-Resolved 3D Models From Consumer Depth Cameras", IEEE Transactions on Information Forensics and Security, vol. 9, No. 9, Sep. 2014, pp. 1436-1448.

Blanz et al., "A Morphable Model for the Synthesis of 3D Faces", In Proceedings of ACM SIGGRAPH 1999, Jul. 1, 1999, 8 pgs.

Cai et al., "3D Deformable Face Tracking with a Commodity Depth Camera", Proceedings of the European Conference on Computer Vision: Part III, Sep. 5-11, 2010, 14 pgs.

Chen et al., "Human Face Modeling and Recognition Through Multi-View High Resolution Stereopsis", IEEE Conference on Computer Vision and Pattern Recognition Workshop, Jun. 17-22, 2006, 6 pgs.

Dainese et al., "Accurate Depth-Map Estimation for 3D Face Modeling", IEEE European Signal Processing Conference, Sep. 4-8, 2005, 4 pgs.

Dou et al., "End-to-end 3D face reconstruction with deep neural networks", arXiv:1704.05020v1, Apr. 17, 2017, 10 pgs.

Fangmin et al., "3D Face Reconstruction Based on Convolutional Neural Network", 2017 10th International Conference on Intelligent Computation Technology and Automation, Oct. 9-10, 2017, Changsha, China.

Fechteler et al., "Fast and High Resolution 3D Face Scanning", IEEE International Conference on Image Processing, Sep. 16-Oct. 19, 2007, 4 pgs.

Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.

Higo et al., "A Hand-held Photometric Stereo Camera for 3-D Modeling", IEEE International Conference on Computer Vision, 2009, pp. 1234-1241.

Hossain et al., "Inexpensive Construction of a 3D Face Model from Stereo Images", IEEE International Conference on Computer and Information Technology, Dec. 27-29, 2007, 6 pgs.

Jackson et al., "Large Post 3D Face Reconstruction from a Single Image via Direct Volumetric CNN Regression", arXiv: 1703.07834v2, Sep. 8, 2017, 9 pgs.

Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.

Lao et al., 3D template matching for pose invariant face recognition using 3D facial model built with isoluminance line based stereo vision, Proceedings 15th International Conference on Pattern Recognition, Sep. 3-7, 2000, Barcelona, Spain.

Medioni et al., "Face Modeling and Recognition in 3-D", Proceedings of the IEEE International Workshop on Analysis and Modeling of Faces and Gestures, 2013, 2 pgs.

Min et al., "Real-Time 3D Face Identification from a Depth Camera", Proceedings of the IEEE International Conference on Pattern Recognition, Nov. 11-15, 2012, 4 pgs.

Park et al., "3D Face Reconstruction from Stereo Video", First International Workshop on Video Processing for Security, Jun. 7-9, 2006, Quebec City, Canada, 2006, 8 pgs.

Rusinkiewicz et al., "Real-Time 3D Model Acquisition", ACM Transactions on Graphics (TOG), vol. 21, No. 3, Jul. 2002, pp. 438-446.

Uchida et al., "3D Face Recognition Using Passive Stereo Vision", IEEE International Conference on Image Processing 2005, Sep. 14, 2005, 4 pgs.

Van Der Wal et al., "The Acadia Vision Processor", Proceedings Fifth IEEE International Workshop on Computer Architectures for Machine Perception, Sep. 13, 2000, Padova, Italy, pp. 31-40.

Wang et al., "Facial Feature Point Detection: A Comprehensive Survey", arXiv: 1410.1037v1, Oct. 4, 2014, 32 pgs.

Widanagamaachchi et al., "3D Face Recognition from 2D Images: A Survey", Proceedings of the International Conference on Digital Image Computing: Techniques and Applications, Dec. 1-3, 2008, 7 pgs.

Yang et al., "Model-based Head Pose Tracking With Stereovision", Microsoft Research, Technical Report, MSR-TR-2001-102, Oct. 2001, 12 pgs.

Zhang et al., "Spacetime Faces: High Resolution Capture for Modeling and Animation", ACM Transactions on Graphics, 2004, 11 pgs.

International Search Report and Written Opinion for International Application No. PCT/IB2018/059366, Search completed Feb. 7, 2019, dated Feb. 15, 2019, 14 Pgs.

Jourabloo et al., "Large-Pose Face Alignment via CNN-Based Dense 3D Model Fitting", 2016 IEEE Conference on Computer Vision and Pattern Recognition (CVPR), IEEE, Jun. 27, 2016 (Jun. 27, 2016), pp. 4188-4196.

Bulat et al., "How far are we from solving the 2D & 3D Face Alignment problem? (and a dataset of 230,000 3D facial landmarks)", Arxiv.org, Cornell University Library, 201 Olin Library Cornell University Ithaca, NY 14853, Mar. 21, 2017.

Caron et al., "Multiple camera types simultaneous stereo calibration", Robotics and Automation (ICRA), 2011 IEEE International Conference on, May 1, 2011 (May 1, 2011), pp. 2933-2938.

Ranjan et al., "HyperFace: A Deep Multi-Task Learning Framework for Face Detection, Landmark Localization, Pose Estimation, and Gender Recognition", May 11, 2016 (May 11, 2016), pp. 1-16.

Sibbing et al., "Markerless reconstruction of dynamic facial expressions", 2009 IEEE 12th International Conference on Computer Vision Workshops, ICCV Workshops : Kyoto, Japan, Sep. 27-Oct. 4, 2009, Institute of Electrical and Electronics Engineers, Piscataway, NJ, Sep. 27, 2009 (Sep. 27, 2009), pp. 1778-1785.

* cited by examiner

SYSTEMS AND METHODS FOR 3D FACIAL MODELING

FIELD OF THE INVENTION

The present invention relates generally to image processing and facial modeling, and more specifically to building three-dimensional (3D) models of a face using color and depth information.

BACKGROUND OF THE INVENTION

Image data describing an image can be associated with a depth map which describes the relative depth of pixels in the described image. Depth maps can be generated using camera systems such as array cameras.

Meshes can be used in modeling 3D objects. A mesh is made of vertices, edges, and faces that define the shape of an object. Meshes can be deformed, or modified, by manipulating the characteristics of the vertices, edges and/or faces.

Facial recognition can be performed on a face by comparing key facial features from an image of a face to a database of faces annotated with key facial features.

SUMMARY OF THE INVENTION

In an embodiment, a 3D facial modeling system includes a plurality of cameras configured to capture images from different viewpoints, a processor, and a memory containing a 3D facial modeling application and parameters defining a face detector, wherein the 3D facial modeling application directs the processor to obtain a plurality of images of a face captured from different viewpoints using the plurality of cameras, locate a face within each of the plurality of images using the face detector, wherein the face detector labels key feature points on the located face within each of the plurality of images, determine disparity between corresponding key feature points of located faces within the plurality of images, and generate a 3D model of the face using the depth of the key feature points.

In another embodiment, the plurality of images is a stereo pair of images.

In a further embodiment, the plurality of cameras includes a stereo pair of cameras.

In still another embodiment, a first camera in the stereo pair of cameras is a wide angle camera, and a second camera in the stereo pair of cameras is a telephoto camera.

In a still further embodiment, generating a 3D model of the face includes providing a convolutional neural network with the disparity between corresponding key feature points of located faces within the plurality of images.

In yet another embodiment, generating a 3D model of the face further includes providing the convolutional neural network with at least one image from the plurality of images.

In a yet further embodiment, the 3D facial modeling application further directs the processor to calculate the depth of at least one key feature point based on the disparity.

In another additional embodiment, calculating the depth of at least one key feature point further includes using calibration data.

In a further additional embodiment, wherein the 3D facial modeling application further directs the processor to animate the 3D model based on a second plurality of images of the face captured from different viewpoints using the plurality of cameras.

In another embodiment again, generating a 3D model of the face includes matching a template mesh to the key feature points.

In a further embodiment again, the template mesh is deformed to fit the key feature points.

In still yet another embodiment, the 3D facial modeling application further directs the processor to generate a depth map for at least one image in the plurality of images.

In a still yet further embodiment, the 3D facial modeling application further directs the processor to update the depth map based on the 3D model of the face.

In still another additional embodiment, the 3D facial modeling application further directs the processor to locate a second face in the plurality of images, and generate a 3D model of the second face.

In a still further additional embodiment, a method for generating a 3D model of a face using a 3D facial modeling system includes obtaining a plurality of images of a face captured from different viewpoints using a plurality of cameras, locating a face within each of the plurality of images using a face detector, wherein the face detector labels key feature points on the located face within each of the plurality of images, determining the disparity between corresponding key feature points of located faces within the plurality of images, and generating a 3D model of the face using the depth of the key feature points.

In still another embodiment again, the method further includes providing a convolutional neural network with the disparity between corresponding key feature points of located faces within the plurality of images.

In a still further embodiment again, the method further includes providing at least one image form the plurality of images to the convolutional neural network.

In yet another additional embodiment, the plurality of cameras includes a stereo pair of cameras.

In a yet further additional embodiment, the plurality of images is a stereo pair of images.

In yet another embodiment again, the method further includes calculating the depth of at least one key feature point based on the disparity.

DETAILED DESCRIPTION

Turning now to the drawings, systems and methods for building 3D facial models from images captured from different viewpoints are discussed. Constructing 3D models from image data can be a resource intensive computing process, especially when the model is of a human face. While images of a human face can be used to generate a 3D model of the face, they are often low quality and have numerous digital artifacts. Conventional techniques can rely on multiple views of the same face and can attempt to generate a depth map from these images in order to generate a 3D model. However, faces, on average, do not have sufficient variation in the intensities of pixels (also referred to as texture) to be able to generate a precise depth map using conventional multiview stereo depth estimation techniques, including, but not limited to, methods utilizing array cameras described in U.S. Pat. No. 8,619,082 entitled "Systems and Methods for Parallax Detection and Correction in Images Captured Using Array Cameras that Contain Occlusions using Subsets of Images to Perform Depth Estimation." U.S. Pat. No. 8,619,082 is hereby incorporated by reference in its entirety. Other conventional techniques can utilize convolutional neural networks (CNNs) to estimate what a 3D version of a 2D image may look like. However, modelling of faces can be difficult due to changes in facial expression, and/or variability in other features of faces.

In order to improve the quality of 3D facial models based on 2D images, facial recognition techniques can be used. Key features of a face, such as those used by facial recognition algorithms, can be utilized across multiple images of the same face to generate localized depth information at the key feature points. Faces generally have high degrees of homogeneity with respect to variation in intensity between pixels from the perspective of depth estimation algorithms. As such, areas like the cheeks, the forehead, and/or the neck can often be inaccurate However, key feature points can be in areas with distinctive features, increasing the accuracy of locating depth information at those points. The depth of key feature points can be used to generate 3D facial models with fewer artifacts in a variety of ways using a 3D facial modeling system in accordance with various embodiments of the invention.

Figure 1:
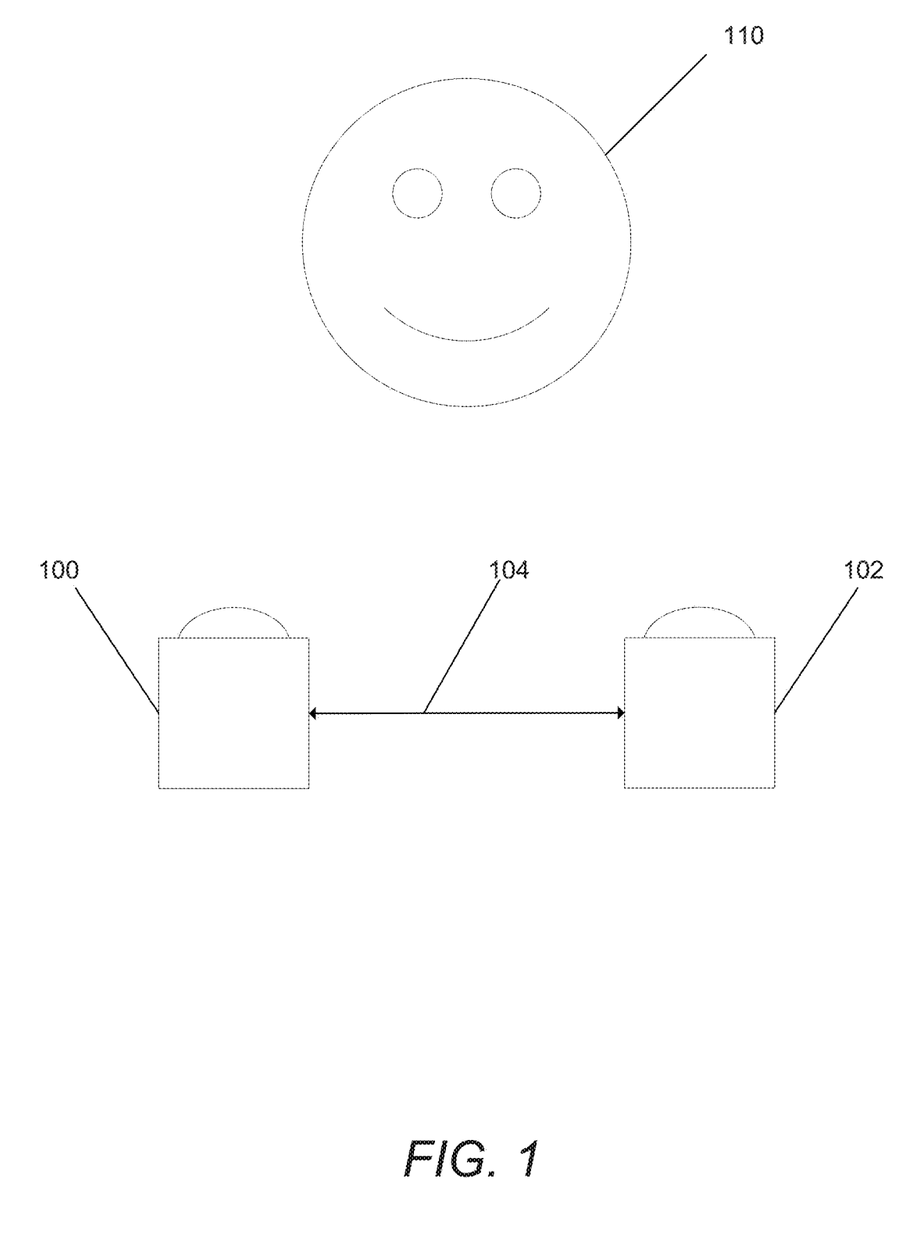
FIG. 1 is an illustration of an image capture system in accordance with an embodiment of the invention.

Generating 3D Facial Models 3D facial models can be generated by 3D facial modeling systems in a variety of ways. In many embodiments, 3D facial modeling systems utilize an array camera of at least two cameras at a known fixed distance (baseline) apart to capture at least two images of a scene from different viewpoints. However, similar results can be achieved using multiple images from a single camera. Parallax based depth estimation techniques can be applied to of the images of the scene from different viewpoints in order to determine depth at key points on the face. A conceptual illustration of an array camera capturing an image of a face from two different viewpoints is illustrated in FIG. 1. A first camera 100 and a second camera 102 are directed towards the face 110 of the subject to be modeled. In many embodiments, the first and second cameras are part of an array camera made up of at least two image sensors. In numerous embodiments, the first and second cameras are a known distance 104 apart and have a known orientation with respect to each other. The cameras can be arranged such that they capture a of images of face 110. In numerous embodiments, the images of the face are a stereo pair of images.

Figure 2:
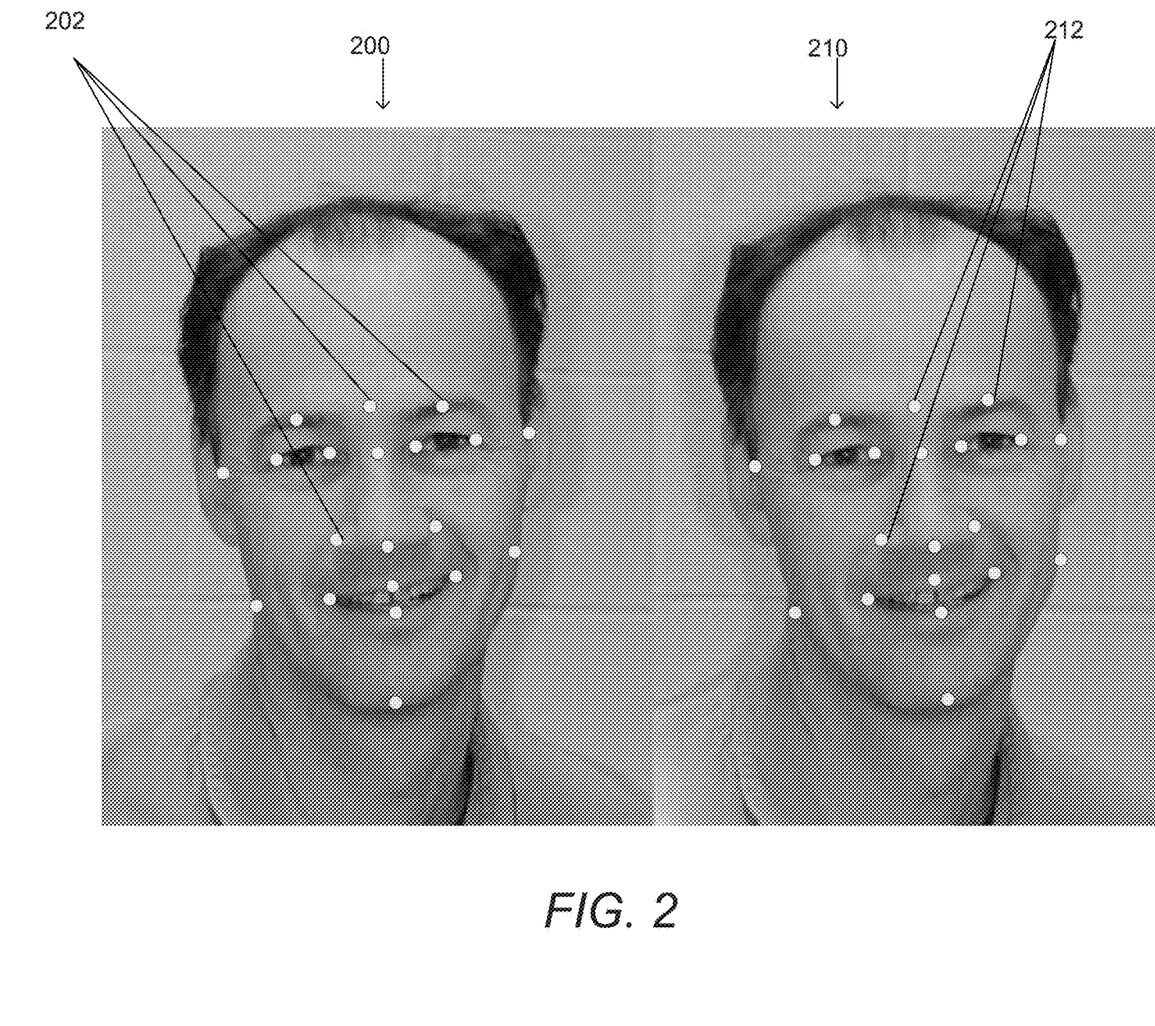
FIG. 2 is an example of a stereo pair of images taken from different viewpoints with identified key feature points in accordance with an embodiment of the invention.
Figure 3:
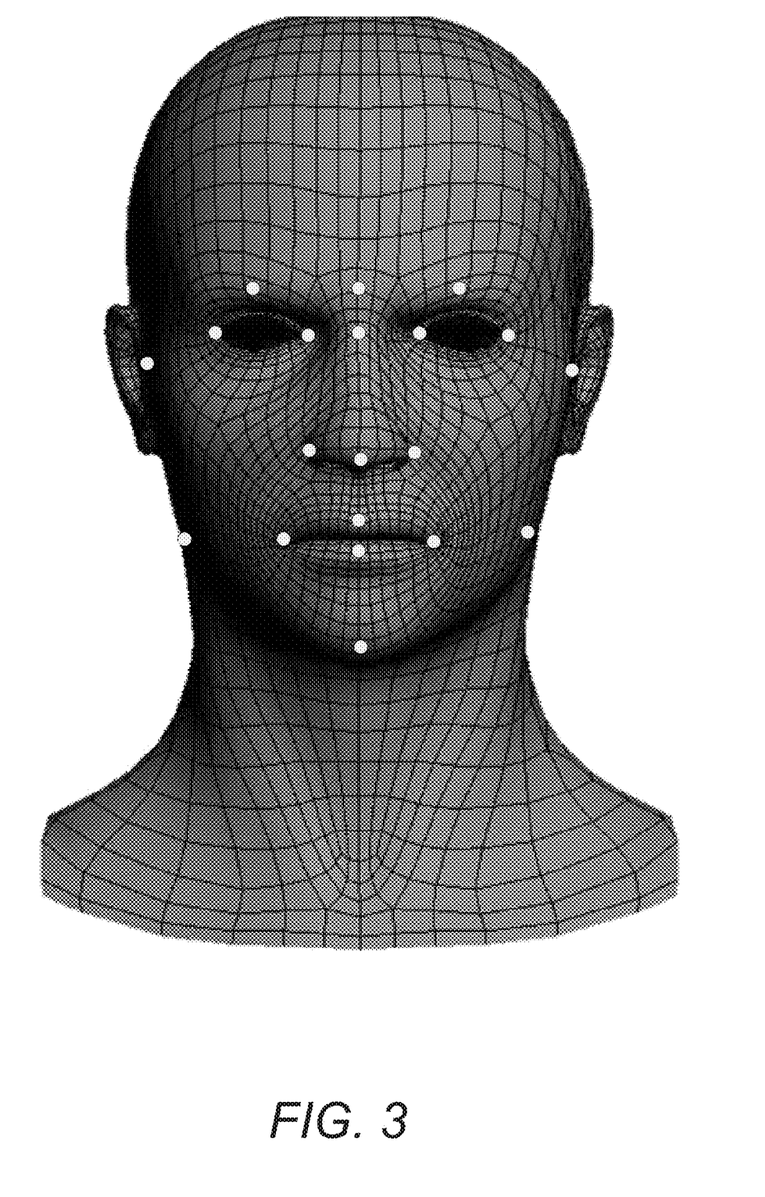
FIG. 3 is an example 3D template mesh with identified key feature points in accordance with an embodiment of the invention.

An exemplary stereo pair of images is illustrated in FIG. 2. Facial recognition can be applied to the stereo pair of images 200 and 210 to detect sets of key feature points 202 and 212 for each image, respectively. In many embodiments, the stereo pair of images are captured at the same time. However, images can be captured at different times. Depth can be determined for the points in the sets of key feature points 202 and 212. The depth information at these key feature points can be used in a variety of ways to generate 3D facial models. In many embodiments, the key feature points can be mapped onto a generic 3D template of a face, and the depth information at the key feature points can be used to deform the template to match the face in the original image. An illustration of an exemplary 3D template with key feature points overlaid is illustrated in FIG. 3. In numerous embodiments, CNNs can be applied using key feature points to generate 3D facial models. However, any number of processes can be utilized, including extrapolating depth information across the entire face using the key feature points, template matching, deforming 3D meshes, and/or any other process as appropriate to the requirements of a given application. While specific key feature points are shown in FIGS. 2 and 3, any number and/or placements of key feature points can be used in accordance with the requirements of a given application.

As noted, key feature points can be utilized in a variety of ways to enhance the quality of 3D facial models based on 2D images. Methods for utilizing 3D facial modeling systems to generate 3D facial models using key feature points are described below.

Processes for Generating 3D Facial Models

Figure 4:
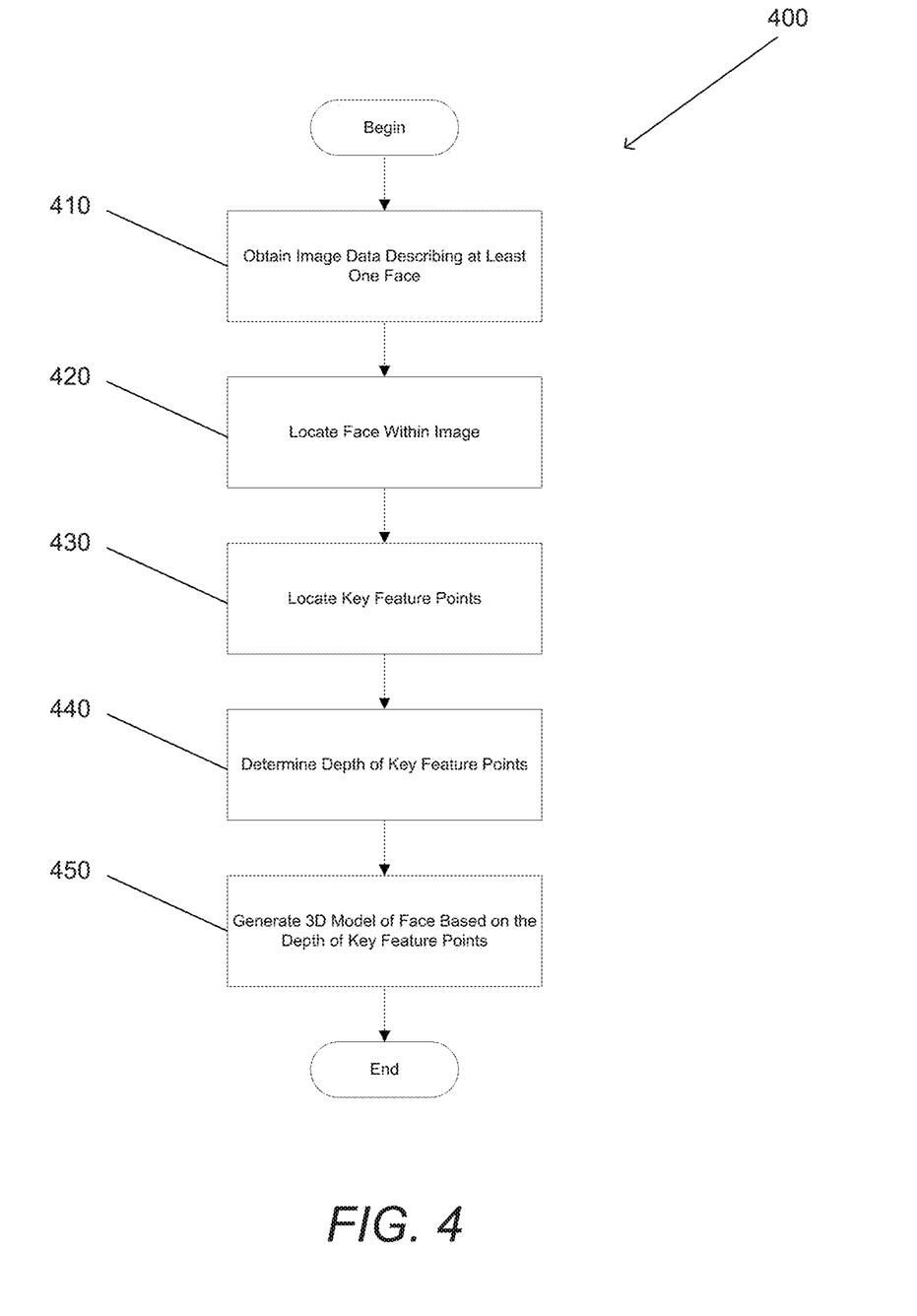
FIG. 4 is a flow chart of a process for generating a 3D facial model in accordance with an embodiment of the invention.

Once obtained, image data describing a face can be used to generate 3D facial models. In many embodiments, 3D facial models are accurate, digital depictions of the subject of the images. Turning now to FIG. 4, a process for generating 3D facial models is illustrated in accordance with an embodiment of the invention.

Figure 5:
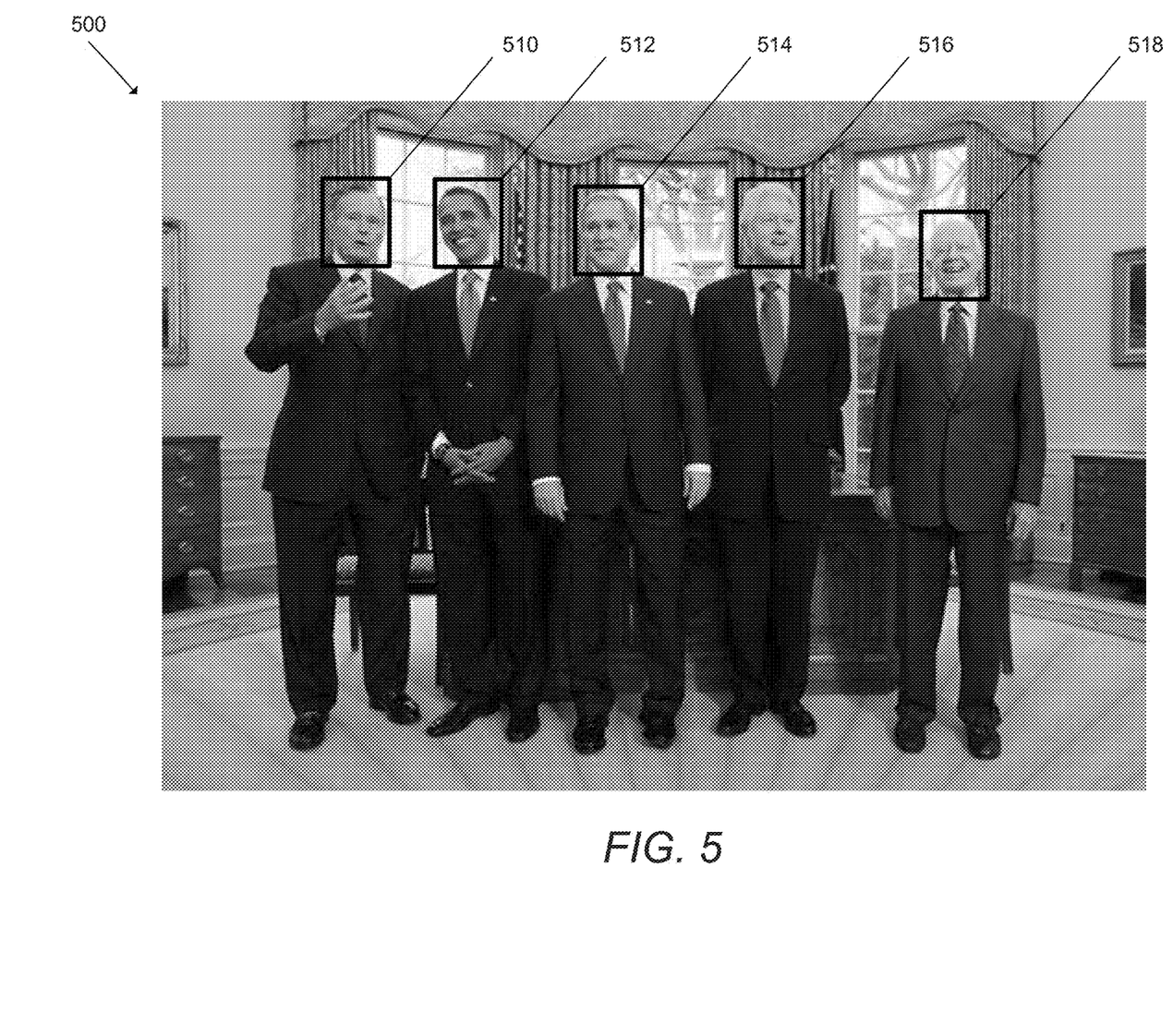
FIG. 5 is an example image with multiple faces identified in accordance with an embodiment of the invention.

Process 400 includes obtaining (410) image data describing at least one face. In many embodiments, image data includes a plurality of images of a scene including at least one face captured from different viewpoints. In numerous embodiments, the plurality of images is a stereo pair of images. The plurality of images can be captured by an array camera, or by a single camera changing position and/or zoom. Faces are located (420) within the image, and key feature points are located (430) on the face. In many embodiments, if more than one face is located within the image, 3D facial modeling systems can separately process each face and generate separate 3D facial models. As an example, FIG. 5 illustrates an example image with individual faces 510, 512, 514, 516, and 518 identified within image 500 in accordance with an embodiment of the invention. In numerous embodiments, only one face is processed. 3D facial modeling systems can selectively generate a model for one of the faces, a specific subset of faces in the image, or all faces in the image based on a user input. Key feature points can be located in a variety of ways. In many embodiments, key feature points are located using facial feature point detection techniques such as, but not limited to constrained local models, active appearance models, and/or regression-based models. However, any number of key feature point recognition methods can be used as appropriate to the requirements of a given application.

Process 400 further includes determining (440) the depth of the key feature points. In many embodiments, depth is determined by using parallax based depth detection methods, such as, but not limited to, a disparity based technique across matching feature points in the plurality of images. While traditional disparity based searches involve searching across a wide array of pixels for matching pixels, pixel patches and/or features, depth estimation techniques in accordance with various embodiments of the invention already known the locations of corresponding key feature points and the disparity between the key feature points is directly determined (without the need to perform a search involving comparisons of pixels along epipolar lines). In numerous embodiments, key feature points are chosen because the region of the face that the key feature point occupies have characteristic features within a region so as to differentiate pixels in the region from surrounding regions and yield high quality depth information. Points such as, but not limited to, the corners of the eyes, a widow's peak, nostrils, corners of the mouth, and or any other sufficiently distinguishable point on the face can be chosen as key feature points. In numerous embodiments, the depth of key feature points are determined by measuring the depth of key feature points across multiple images in the plurality of images, and applying a statistical averaging technique to estimate a true depth value.

Process 400 can also include generating (450) a 3D model of a face based on the depth of the key feature points. In many embodiments, 3D models are generated using CNNs. A CNN can be trained using an image data set including stereo images with key feature points identified and corresponding accurate 3D models keyed to the images. In many embodiments, accurate 3D laser scans are used to generate the 3D models in the training data. The CNN can then be provided with the depth information of the key feature points to yield a 3D model of the face. In many embodiments, the CNN can be provided with at least one of the images containing the face. In numerous embodiments, the provided images can be used to colorize (apply a texture) to a 3D mesh model of the face.

In many embodiments, process 400 and similar processes can be performed iteratively over image sequences, such as video data to generate an animated 3D model that changes over time to represent a changing face over time. In numerous embodiments, animating a 3D model is achieved by estimating the 3D pose of the subject face in the video data over time. For example, an iterative implementation can produce a 3D model that represents a face speaking and/or displaying facial poses. In some embodiments, the sequence is generated utilizing processes similar to the processes described above to generate a 3D model corresponding to the images in each frame. In a number of embodiments, an initial 3D model is constructed and subsequent frames of video are simply used to drive the animation of the 3D model. In certain embodiments, tracked features in the captured images can be utilized to drive animation of the 3D model using blend shapes.

Further, in numerous embodiments, the 3D facial modeling system can generate a depth map (and potentially a confidence map indicate of the confidence of particular depth estimates) for the entire face using parallax based depth estimation techniques. Depth maps can be used to check the accuracy of generated 3D facial models. In turn, generated 3D facial models can be used to check depth maps. In numerous embodiments, errors can be reduced in the 3D model by generating multiple 3D models from images taken from multiple viewpoints. Key points from the multiple 3D models can be identified and a 3D best-fit model can be generated. In many embodiments, 3D best-fit models can be generated by averaging the errors across the multiple 3D models. In a variety of embodiments, errors can be detected by projecting the 3D model to the 2D image through reprojection error detection processes. Detected errors can be used to further refine the 3D model to align with the captured 2D image of the face.

While numerous systems and methods have been described above for generating 3D models with respect to faces, the described techniques are applicable to model any class of objects, including, but not limited to, other types of faces (i.e. animal), or any other class of physical object. In many embodiments, the described techniques can be applied to different types of image data, such as, but not limited to, depth maps describing a scene, video data, and/or synthetic 2D images. 3D facial modeling systems can be used to improve depth map generation systems.

Deforming Template Meshes

Figure 6:
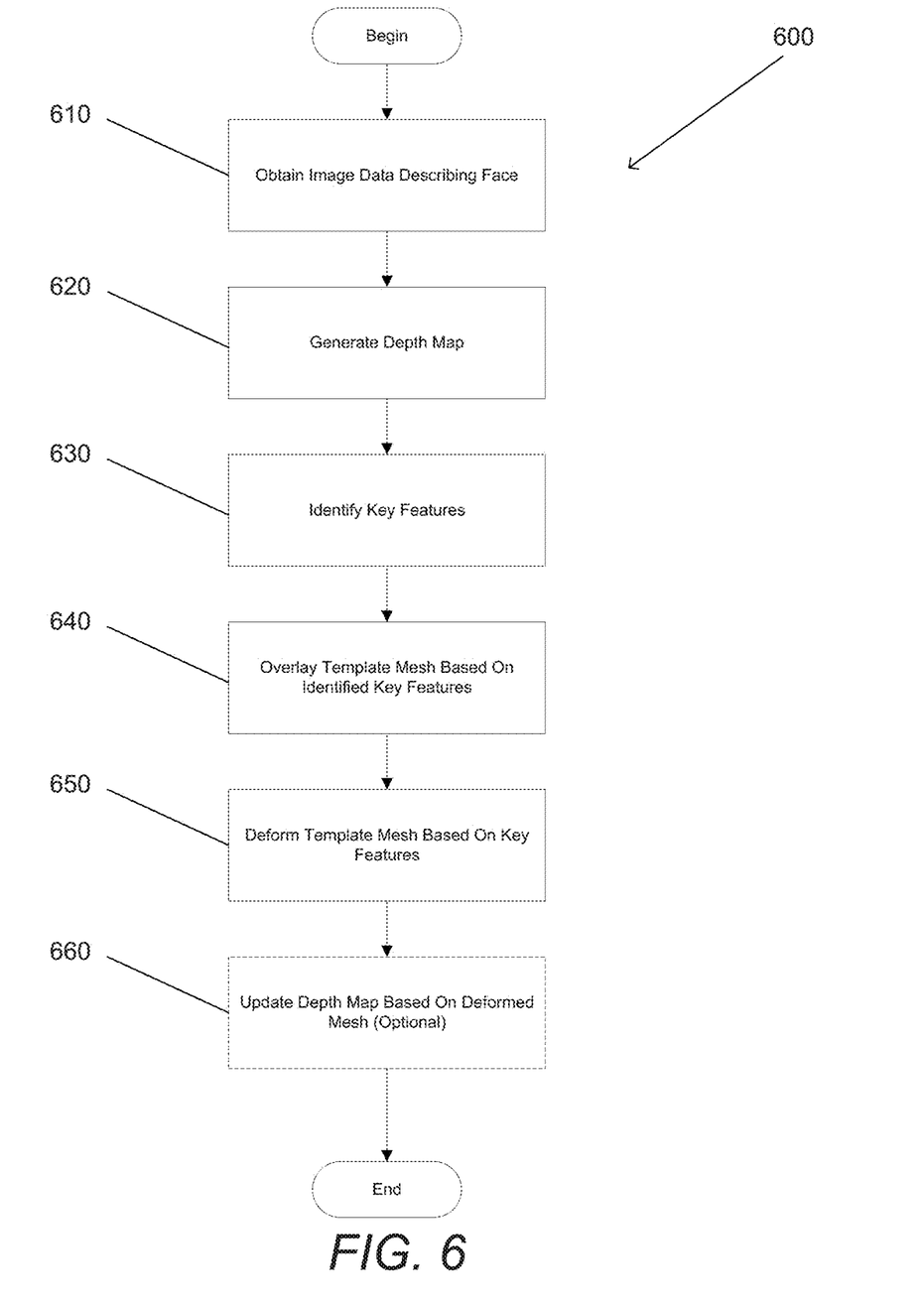
FIG. 6 is a flow chart of a process for generating a 3D facial model in accordance with an embodiment of the invention.

While CNNs can be used to generate 3D facial models. 3D facial modeling systems can use template meshes to approximate a facial model using key feature points. A process 600 for deforming a template mesh based on key features includes obtaining (610) image data including images in which a face is visible captured from different viewpoints. In many embodiments, image data is obtained in a similar manner as described above. A depth map can be generated (620) from the obtained image data. Depth maps can be structured in such a way as to describe the relative depth of pixels within the image data. In some embodiments, the generated depth map has inaccuracies and/or digital artifacts resulting from insufficient image data.

Key features can be identified (630) in the obtained image data. In many embodiments, known facial recognition techniques can be applied to the image data to identify key features, such as, but not limited to, eyebrows, eyes, the nose, the mouth, the chin, the ears, or any other key features as appropriate to the requirements of a given application. In many embodiments, a user can input which key features to detect. In the event the subject is missing a key feature, or it is difficult to detect, a user can indicate which key features to not try and detect. In numerous embodiments, 3D facial modeling systems can automatically identify which key features to not detect. A determination as to when a feature cannot be reliably detected can be made by determining a degree of certainty with which a particular identified feature is identified, and if the degree of certainty is below a threshold value, disregarding the identified feature.

Once key features are identified, a template mesh can be overlaid onto the identified key features by matching identified key features to known key features in the template mesh. In numerous embodiments, the template mesh is a mesh of a generic human face. However, different template meshes can be chosen based on the subject of the captured images. For example, a female template mesh can be used for female subjects, and/or a male mesh can be used for male subjects. However, any number of template meshes can be used, including, but not limited to, only a single generic template mesh, as appropriate to the requirements of a given application. Additionally, any number of template meshes can be used that are specific to a particular group and/or grouping of facial types. The template mesh can be morphed or deformed (650) using the depth map to fit the key features in the template mesh to the corresponding key features in the imaged face. The problem of morphing this template mesh based on the key feature points is referred to as scattered data interpolation. In numerous embodiments, the morphed or deformed mesh can be used to interpolate depth information to update (660) the depth map of the original captured image data. The depth of the deformed mesh can be used to check and/or add depth data to a depth map. In a variety of embodiments, texture can be applied to the template mesh by assigning color values to regions on a texture based on the captured image data to form a 3D facial model of the subject.

While deformed meshes can be used to update depth map data, there are numerous ways that 3D facial modeling systems can be used to improve the efficiency of generating a depth map for an image. Exemplary methods for improving efficiency and/or quality of depth map generation are discussed below.

Improving Depth Map Generation Using 3D Facial Modeling Systems

Generating depth maps for images can be a computationally intensive process. In many scenarios, regions of images can be difficult to generate depth maps for a variety of reasons, including, but not limited to, insufficient variation in pixel intensity, insufficient lighting, or any other condition which frustrates depth map generation. In numerous embodiments, 3D facial modeling systems can be used to reduce computation time and/or increase efficiency when generating depth maps of images containing faces.

3D facial modeling systems can identify faces in images, and can generate a depth map using depth map generation techniques described above for portions of the images not containing faces. In numerous embodiments, the 3D model of faces in the images can be utilized to reincorporate depth information into the generated depth map. In this way, regions that can frustrate depth map generation, such as faces, can be ignored by depth map generation techniques.

In numerous embodiments, multiple identified faces can be located using 3D facial modeling systems. After finding a first face in a plurality of images of a scene containing faces from different viewpoints in a first image, a search can be performed across an epipolar line in the other image(s) in order to reduce the search space for the matching face. In this way, further computational efficiency can be gained.

Further, in numerous embodiments, locating faces and/or key feature points can be improved by estimating the location of a face or key feature point based upon the location of the face or key feature point in other images within the plurality of images. Once a face or key feature point is located in one image, the search space can be narrowed when searching in other images in the plurality of images. Depth maps generated from at least two images in the plurality of images can be used to identify faces in other images in the plurality of images in a similar manner by locating points of similar depth.

While several methods for improving depth map generation using 3D facial modeling systems have been described above, any number of improvements can be found in accordance with the requirements of a given application, such as, but not limited to, utilizing depth thresholds prior to implementing facial recognition techniques to estimate whether or not faces are present in an image. Systems for implementing process for generating 3D facial models are described below.

3D Facial Modeling Systems 3D facial modeling systems can capture images of a scene from multiple viewpoints and identify faces in the obtained images. The faces within each image can be identified by the 3D facial modeling system and key feature points on identified faces can be matched across images. Depth estimation techniques can be utilized with respect to the identified key feature points, and a 3D facial model can be generated using the identified key feature points and their corresponding depth estimates. In many embodiments, the 3D facial model is a 3D mesh that conforms to the face captured in the image. 3D facial modeling systems can be implemented on a variety of devices and/or across multiple devices.

Figure 7:
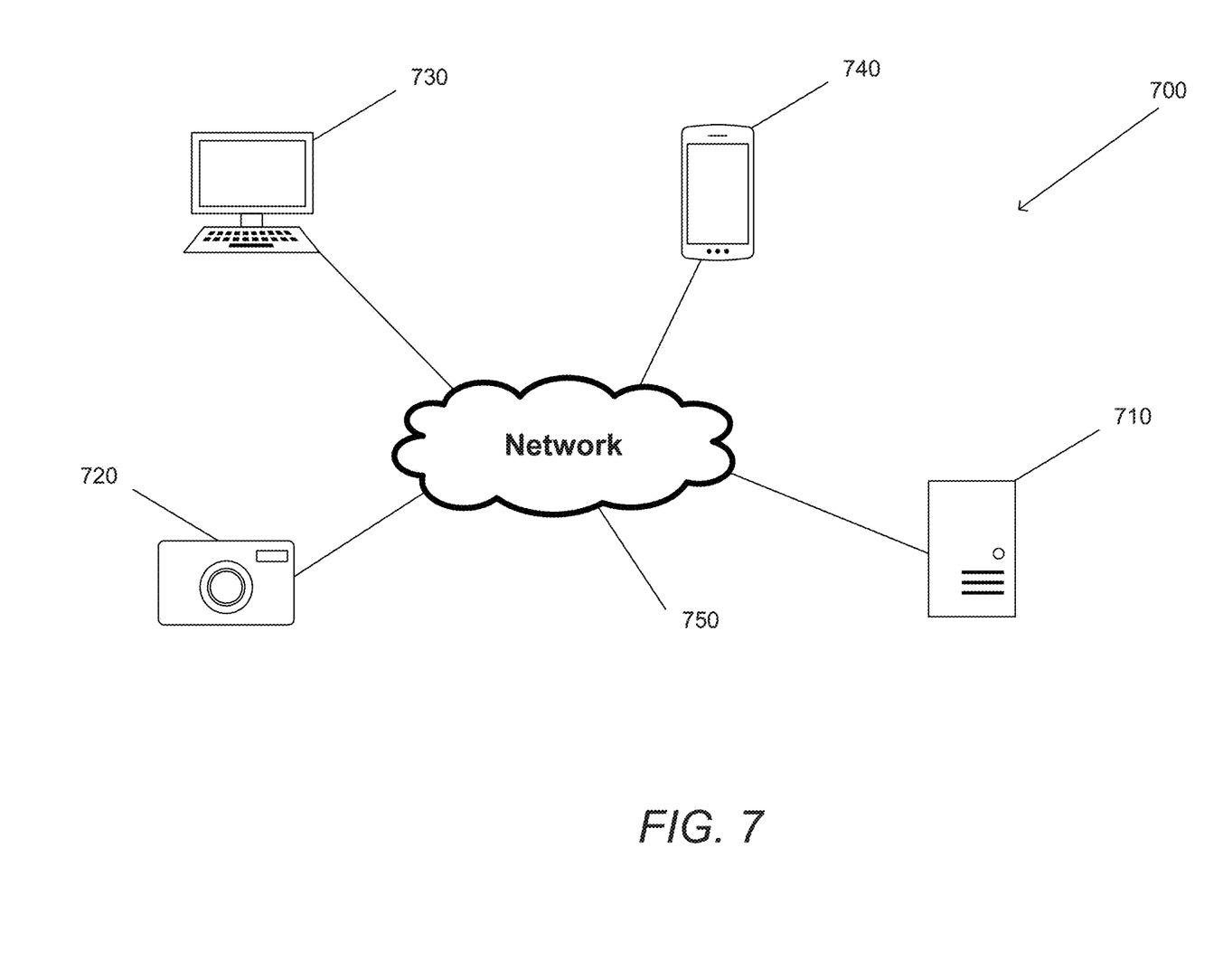
FIG. 7 is a system diagram illustrating connected components of a 3D facial modeling system in accordance with an embodiment of the invention.

Turning now to FIG. 7, a 3D facial modeling system is illustrated in accordance with an embodiment of the invention. 3D facial modeling system 700 can include an image processing device 710. In many embodiments, image processing devices are image processing servers containing at least a processor, and memory. In some embodiments, image processing devices have a communications port configured to communicate with other devices over a network 750. While image processing devices can be implemented on server systems, image processing devices can be made using Field Programmable Gate Arrays, Application-Specific Integrated Circuits, smart phones, personal computers, or any other computing system as appropriate to the requirements of a given application.

3D facial modeling system 710 further includes at least one camera 720 capable of generating a depth map. In many embodiments, the at least one camera is an array camera. Array cameras can be made of two or more image sensors a known, fixed distance apart. However, any number of image capture devices capable of generating a depth map can be used as appropriate to the requirements of a given application.

3D facial modeling systems can have display devices such as, but not limited to, personal computers 730, smart phones 740, or any other device capable of displaying visual information as appropriate to the requirements of a given application. Display devices can be used to visualize 3D facial models generated by 3D facial modeling systems.

In numerous embodiments, devices that are part of the 3D facial modeling system have at least one communications port capable of transmitting data over a network 750. In many embodiments, communications ports can transmit data wirelessly over a network using a wireless communications protocol such as, but not limited to, IEEE 802.11 (WiFi), IEEE 802.15 (Bluetooth), or any other wireless communications protocol as appropriate to the requirements of a given application. In numerous embodiments, communications ports can transmit data over wired networks, or a combination of wireless and wired networks. In a variety of embodiments, the network is the Internet, a Local Area Network, a Wide Area Network, and/or any other network as appropriate to the requirements of a given application. Further, in numerous embodiments, image processing devices and display devices can be integrated into the same machine. In many embodiments, a single machine can house an image processing device, a display device, and a camera. In fact, any combination of devices in a 3D facial modeling system can be implemented on at least one machine. 3D facial modeling systems in accordance with various embodiments of the invention are discussed below.

System Architecture for 3D Facial Modeling Systems

In order to capture depth information at key feature points, 3D facial modeling systems may utilize one or more subsets of cameras having different baseline distances between cameras as needed for accurately determining depth. In many embodiments, multiple view images can be captured as a sequence of images using a single moving camera, where the baseline between captured images is estimated. A 3D facial modeling system that utilizes one or more cameras in accordance with an embodiment of the invention is conceptually illustrated in FIG. 8.

Figure 8:
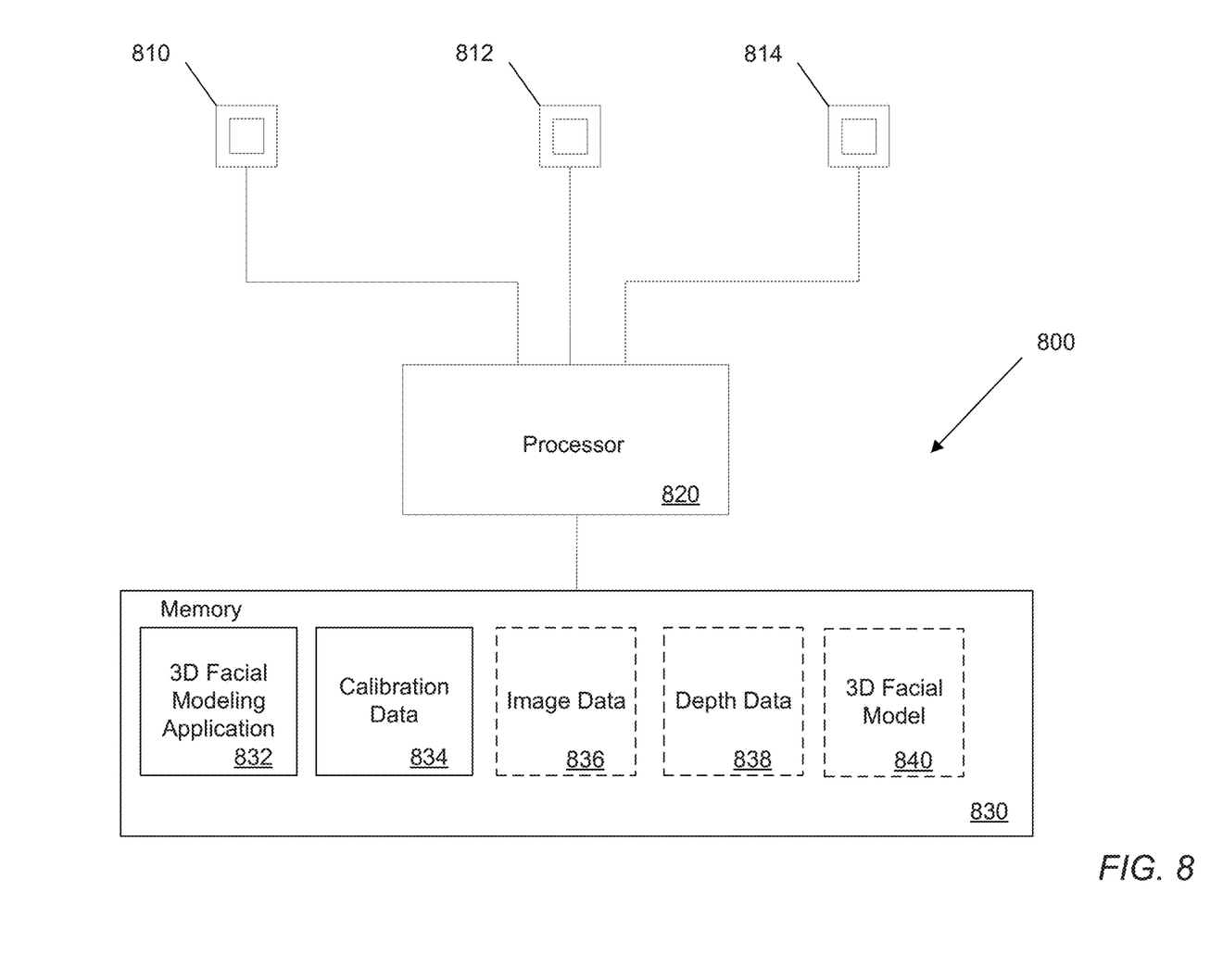
FIG. 8 is a conceptual illustration of a 3D facial modeling system that uses one or more camera arrays in accordance with an embodiment of the invention.

3D facial modeling system 800 can include one or more cameras 810, 812, and 814. In many embodiments that incorporate an array of two or more cameras that each capture a view of the same scene (i.e. have at least partially overlapping fields of view), the cameras are arranged a known, fixed distance apart, called a camera array. In numerous embodiments, multiple camera arrays are used. Cameras can have different lens types, focal lengths, image sensors, and/or any other camera parameter as appropriate to the requirements of a given application. For example, a vertically arranged pair of black and white cameras, where one camera uses a fish-eye lens can be used in conjunction with a red light camera and a green light camera. In numerous embodiments, a stereo pair of cameras are used where one camera is telephoto and one is wide angle. In a variety of embodiments, a stereo pair of cameras are used where one camera is black and white, and the other is color. In many embodiments, a stereo pair of cameras with differing resolutions are used. However, any orientation and/or number of cameras can be used along with any combination of camera types including cameras that utilize Bayer filters and/or RGB near-IR color filter patterns. In numerous embodiments, array cameras are integrated into a mobile device. Different types of array cameras are described in U.S. Pat. No. 8,902,321 entitled "Capturing and Processing of Images Using Monolithic Camera Array with Heterogeneous Imagers," and U.S. Patent Publication 20160309134 entitled "Multi-Baseline Camera Array System Architectures for Depth Augmentation in VR/AR Applications." U.S. Pat. No. 8,902,321 and U.S. Patent Publication 20160309134 are hereby incorporated by reference in their entireties.

3D facial modeling system 800 further includes a processor 820 operatively connected to the one or more cameras and a memory 830. Processors can be, but are not limited to, central processing units (CPUs), graphics processing units (GPUs), machine vision processors, application-specific integrated circuits, field-programmable gate arrays, or any other processing unit as appropriate to the requirements of a given application.

Memory 830 can be any machine-readable storage device, including, but not limited to, hard disk drives (HDD), solid state drives (SSD), flash memory, RAM, or any other volatile and/or non-volatile memory type as appropriate to the requirements of a given application. Memory 830 stores a 3D facial modeling application 832. 3D facial modeling applications can direct the processor to perform methods for generating and/or rendering 3D facial models. In many embodiments, 3D facial modeling applications contain face detector data which can be used to locate faces within images. Face detector data can include, but is not limited to, key feature points that can be used to detect faces, or any other parameter as appropriate to the requirements of a given application.

Calibration data 834 is stored on Memory 830. Calibration data can include photometric and/or geometric calibration data which can be used to rectify images captured by the cameras. However, calibration data can include any type of data which can be utilized to rectify images in accordance with the requirements of a given application. Memory 830 can also contain image data 836 describing a plurality of images taken from different viewpoints. In many embodiments, the image data is captured using the one or more cameras.

Memory 830 can also store depth and/or disparity data 838. Depth data can describe the depths of key feature points, depth maps, edge maps, or any other depth information as appropriate to the requirements of a given application. Depth is inversely proportional to disparity, which can be measured by comparing the relative offset along epipolar lines of known features using techniques similar to those outlined above. At least one 3D facial model 840 can also be stored on memory 830. 3D facial models can be generated from the image data using 3D facial modeling systems and/or remote services and the resulting 3D facial models distributed to the 3D facial modeling system for storage in memory.

While specific implementations of 3D facial modeling systems have been described above with respect to FIG. 8, there are numerous configurations of 3D facial modeling systems, including, but not limited to, those using various numbers of cameras, using distributed computing systems, and/or any other configuration as appropriate to the requirements of a given application. In numerous embodiments, 3D facial modeling systems can be implemented in mobile devices, including, but not limited to, cellular telephones, smartphones, tablet computers, laptop computers, and/or any other device as appropriate to the requirements of a given application. 3D facial modeling systems can be utilized to generate 3D facial models.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A 3D facial modeling system comprising:
 a plurality of cameras configured to capture images from different viewpoints;
 a processor; and
 a memory containing a 3D facial modeling application and parameters defining a face detector, wherein the 3D facial modeling application directs the processor to:
  obtain a plurality of images of a face captured from different viewpoints using the plurality of cameras;
  locate a face within each of the plurality of images using the face detector, wherein the face detector labels key feature points on the located face within each of the plurality of images;
  select at least one pair of key feature points, comprising a labeled key feature point in a first image of the plurality of images, and the correspondingly labeled key feature point in a second image in the plurality of images;
  determine a depth value for each selected key feature point in the first image by calculating the disparity between the at least one pair of key feature points; and
  generate a 3D model of the face by providing a convolutional neural network with the determined depth values and the first image.

2. The 3D facial modeling system of claim 1, wherein the plurality of images is a stereo pair of images.

3. The 3D facial modeling system of claim 1, wherein the plurality of cameras comprises a stereo pair of cameras.

4. The 3D facial modeling system of claim 3, wherein:
 a first camera in the stereo pair of cameras is a wide angle camera; and
 a second camera in the stereo pair of cameras is a telephoto camera.

5. The 3D facial modeling system of claim 1, wherein generating a 3D model of the face further comprises providing the convolutional neural network with at least one image from the plurality of images.

6. The 3D facial modeling system of claim 1, wherein the 3D facial modeling application further directs the processor to calculate the depth of at least one key feature point based on the disparity.

7. The 3D facial modeling system of claim 6, wherein calculating the depth of at least one key feature point further comprises using calibration data.

8. The 3D facial modeling system of claim 1, wherein the 3D facial modeling application further directs the processor to animate the 3D model based on a second plurality of images of the face captured from different viewpoints using the plurality of cameras.

9. The 3D facial modeling system of claim 1, wherein generating a 3D model of the face comprises matching a template mesh to the key feature points.

10. The 3D facial modeling system of claim 9, wherein the template mesh is deformed to fit the key feature points.

11. The 3D facial modeling system of claim 1, wherein the 3D facial modeling application further directs the processor to generate a depth map for at least one image in the plurality of images.

12. The 3D facial modeling system of claim 11, wherein the 3D facial modeling application further directs the processor to update the depth map based on the 3D model of the face.

13. The 3D facial modeling system of claim 1, wherein the 3D facial modeling application further directs the processor to:
locate a second face in the plurality of images; and
generate a 3D model of the second face.

14. A method for generating a 3D model of a face using a 3D facial modeling system, the method comprising:
obtaining a plurality of images of a face captured from different viewpoints using a plurality of cameras;
locating a face within each of the plurality of images using a face detector, wherein the face detector labels key feature points on the located face within each of the plurality of images;
selecting at least one pair of key feature points, comprising a labeled key feature point in a first image of the plurality of images, and the correspondingly labeled key feature point in a second image in the plurality of images;
determining a depth value for each selected key feature point in the first image by calculating the disparity between the at least one pair of key feature points; and
generating a 3D model of the face by providing a convolutional neural network with the determined depth values and the first image.

15. The method for generating a 3D model of a face using a 3D facial modeling system of claim 14, the method further comprising providing a convolutional neural network with the disparity between corresponding key feature points of located faces within the plurality of images.

16. The method for generating a 3D model of a face using a 3D facial modeling system of claim 15, the method further comprising providing a second image from the plurality of images to the convolutional neural network.

17. The method for generating a 3D model of a face using a 3D facial modeling system of claim 14, wherein the plurality of cameras comprise a stereo pair of cameras.

18. The method for generating a 3D model of a face using a 3D facial modeling system of claim 14, wherein the plurality of images is a stereo pair of images.

19. The method for generating a 3D model of a face using a 3D facial modeling system of claim 14, the method further comprising calculating the depth of at least one key feature point based on the disparity.

* * * * *